June 6, 1967   R. P. MAURER ET AL   3,324,211
METHOD FOR PRODUCING A UNIFORM FOAMED SURFACE
ON A PLASTIC ARTICLE
Filed June 24, 1964
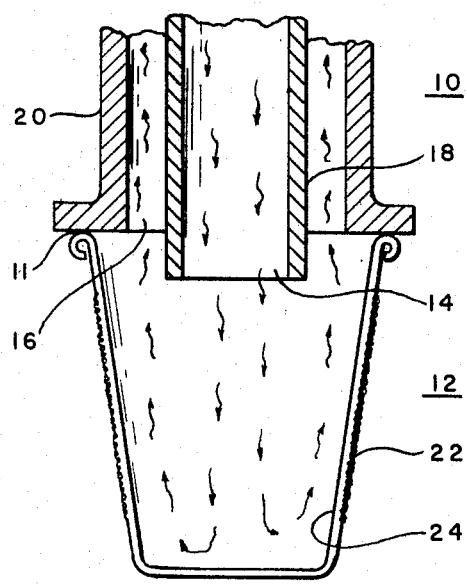
Fig. I
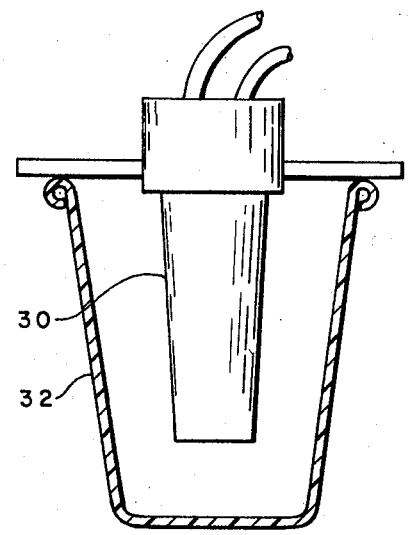
Fig. II
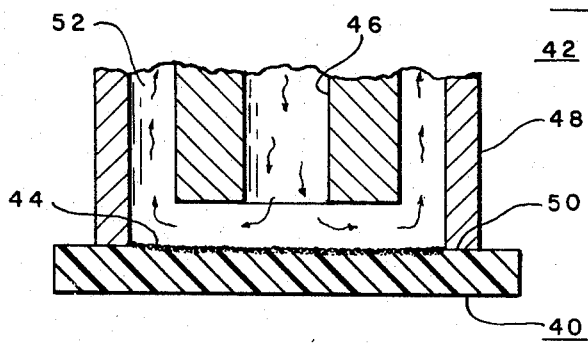
Fig. III
RICHARD P. MAURER
ARDASHUS A. AYKANIAN   INVENTORS.
BY James C. Logomasini
ATTORNEY

United States Patent Office 3,324,211
Patented June 6, 1967

3,324,211
METHOD FOR PRODUCING A UNIFORM FOAMED SURFACE ON A PLASTIC ARTICLE
Richard P. Maurer and Ardashus A. Aykanian, Wilbraham, Mass., assignors to Monsanto Company, St. Louis, Mo., a corporation of Delaware
Filed June 24, 1964, Ser. No. 377,646
9 Claims. (Cl. 264—45)

ABSTRACT OF THE DISCLOSURE

A method of partially foaming a plastic article whereby a medium is absorbed into one side of a plastic article and heat is subsequently applied to the opposite side of the plastic article to cause a portion of the plastic which absorbed the medium to foam. The medium is one which must be absorbable by the plastic article and convertible to a gaseous state at a temperature below the melting point temperature of the plastic used to form the article.

---

The present invention relates to the manufacture of plastic articles and more particularly to the manufacture of plastic articles having insulating surfaces.

It is well known in the art that plastic foams can be made by incorporating a blowing agent or liberating gas material into a thermoplastic resin and subsequently raising the temperature of the resin. This causes the blowing agent to convert from a solid or liquid state to a gaseous state thereby expanding the resin to produce cellular structures. The resulting foamed resin is of a much lighter density than the original resin and generally possesses greatly increased sound dampening and heat insulating properties.

In spite of the advantages gained by foaming plastic resins, the use of these foamed materials has been limited for many purposes because of the comparatively poor structural strengths of the final fabricated articles. To minimize this problem, various methods for supporting the foamed resin have been devised, most of which involved adhering or bonding solid or rigid members to the foam. However, these structures are generally difficult and expensive to construct and are sometimes limited in their application depending on the effectiveness of the bonding operation and the difficulty of preserving the foam intact.

In Patent No. 3,262,625, filed Apr. 12, 1963, there is described the formation of plastic articles which combine the insulating characteristics of foamed resin and the structural stability and strength of non-foamed plastic. In brief, these plastic articles are produced by steeping a plastic article in a medium which is absorbable by the plastic for a predetermined interval of time, removing the plastic article from the medium and finally heating the plastic article to produce a foamed cover.

Although the plastic articles obtained by the above described process have a better combination of insulating and structural characteristics over completely foamed plastic articles, the foam which is produced generally varies in quality. More specifically, the depth and cell size of the foam is not particularly uniform over the surface of the article thereby seriously affecting its insulating and structural character. It has been found that this effect has been primarily due to minute variations in temperature and/or time of exposure to specific temperatures along localized regions of the article being treated and consequently a unique method of heating partially steeped plastic articles has been developed which overcomes the problem of foam non-uniformity.

Accordingly, it is a principal object of the present invention to manufacture plastic articles having an improved combination of insulating and structural characteristics.

Another object of the present invention is to provide a method for partially foaming plastic articles to obtain an improved combination of insulating and structural characteristics.

A further object of the present invention is to provide method for partially foaming plastic articles to produce an improved and more uniformly foamed surface.

Other objects of the present invention will in part be obvious and will in part appear hereinafter.

These and other objects are attained by exposing a surface portion on one side of a plastic article to a medium which is absorbable by the plastic and applying heat to a surface on the opposite side of the plastic article to cause surface areas which had been exposed to the medium to foam. The medium which is absorbable by the plastic is considered to be any material which is (1) absorbable by the plastic being processed and (2) convertible to a gaseous state at a temperature below the melting point temperature of the plastic.

The following drawings are provided for the purpose of illustrating various embodiments of the present invention.

FIGURE I is a side view, partly in section and with parts broken, illustrating an embodiment of the present invention whereby a fluid heated to elevated temperatures is being criculated within a plastic container.

FIGURE II is a side view, partly in section and with parts broken, showing radiating means being utilized to heat the internal walls of a container.

FIGURE III is a side view, partly in section and with parts broken, illustrating the heating of a plastic article other than a container, i.e., a panel.

Referring in detail to the figures of the drawings and more specifically FIGURE I, there is schematically shown a heating device 10 mounted over and in abutment with the rim 11 of a plastic container 12. The heating device 10 has an inlet 14 and an outlet 16 for circulating a fluid which has been previously heated to elevated temperatures. Inlet 14 is at the end of a conduit 18 which is positioned concentrically within the outer discharge conduit 20. The plastic container 12 is a container that has had a portion of its outer surface 22 exposed to a volatile medium which resulted in some of the medium being absorbed into the plastic.

In operation, a fluid heated to an elevated temperature flows from the concentric conduit 18 and circulates within the container before discharge along the outer discharge conduit 20. The circulation of the heating fluid within the plastic container 12 results in a heat transfer from the fluid to the inner walls 24 of said container causing a further heat transfer or flow across the body or wall of the plastic. This flow of heat then causes the outer surface 22 which was previously exposed to the volatile medium to foam. It is found that this method of indirect heating will produce a foamed covering of uniform depth and cell size on the exterior of the container which is much superior to that obtained by direct heating of the exposed plastic areas.

The heating fluid which is employed in this embodiment may be either a liquid or a gas. For ease of handling, however, a gas is generally preferred. In most instances, the gas employed will be air heated to elevated temperatures.

FIGURE II illustrates an alternate method of heating the internal surfaces of a container to produce an extremely uniform foamed covering on external portions of the container. In this embodiment, heater unit 30 is an electrical element, e.g., a covered Nichrome wire, which radiates heat against the internal walls of container 32. For optimum performance when utilizing this embodiment, it has been found that the efficiency of the electrical heating unit can be improved to a large extent by a low-velocity circulation of air or other gas through the container during the heating process.

FIGURE III illustrates the use of the present invention to partially foam plastic articles other than containers. For example, FIGURE III discloses a plastic slab or panel 40 abutting a heating device 42 for the purpose of foaming the upper or abutting surface 44 of the plastic panel 40. In operation, the heating device 42 is similar to the one shown in FIGURE I. In other words, a fluid heated to an elevated temperature flows from the concentric conduit 46 and circulates within the area enclosed by the plastic panel 40 and the outer casing 48 of the heating device 42. The plastic panel 40 is lightly pressed against the lower edge 50 of the outer casing 48 to minimize fluid leakage into the surrounding atmosphere. The fluid discharges through the outer passageway 52 between the concentric conduit 46 and the outer casing 48. The above description and particularly the drawings are set forth for the purpose of illustration and not for the purpose of limitation. Any heating device may be employed which is capable of heating a surface of the plastic in order that a heat flow across the body of the plastic will occur to cause an opposite surface of the plastic to foam. Consequently, any heating device which will perform this function is within the scope of this invention. The preferred method is the one which utilizes a circulating fluid such as air which has been heated to elevated temperatures. This method depends on the principle of convection for the transfer of heat. However, methods which rely on the principles of conduction, irradiation, etc. are also suitable.

The present invention is utilized in a process for foaming a surface of a plastic article which comprises partially immersing the plastic article in a medium which is absorbable by the plastic and then applying heat in accordance with this invention to foam portions of the plastic surface which were immersed. In practice, the medium will generally contain a component which is a solvent for the plastic. Although heat alone may be used to soften the plastic sufficiently for foaming, it is generally preferred to use a solvent to soften the plastic to prevent any distortion from excessive heating. As previously mentioned the overall process is described in detail in the Patent No. 3,262,625, filed April 12, 1963. More specifically, the overall process involves shaping a solid plastic article, steeping the plastic article in a medium which is absorbable by the plastic for a predetermined interval of time, removing the plastic article from the medium and finally heating the plastic article to produce a foamed covering at all or portions of the surface area which had been in contact with the absorbable medium. In the practice of the present invention, a unique method of heating is utilized which results in a foamed covering on the plastic having good heat insulating and structural characteristics. By uniformity of foam is meant (1) a minimum variation of foam depth over the area covered by the foam, (2) uniformity of cell size within the foam and (3) a minimum of collapsed and/or distorted cells. All contribute towards optimizing the heat insulating and structural properties of the plastic. The need for a uniform foamed surface is particularly critical for thin-walled containers designed to hold hot liquids. Lack of uniformity in the foamed outer surface of a cup or other container can cause localized hot areas. Of more importance, a thin-walled cup which has been partially but nonuniformly foamed may have areas of relative weakness which might cause a cup containing a hot liquid to burst possibly injuring the holder.

The amount of heat which will be required to accomplish the foaming operation will generally depend on the type of plastic being foamed, the general or average thickness of the plastic, and the length of exposure and type of medium used in the process. The effect of these variables may be illustrated by the following examples which are given to illustrate the invention and are not intended as limitations thereof. Unless otherwise specified, quantities are mentioned on a weight basis.

EXAMPLE I

Styrene homopolymer having a Staudinger molecular weight of approximately 55,000 is molded from a sheet in the form of a smooth, tapered cup which is approximately four inches in height with an average inside cup diameter of two and one-quarter inches. The average thickness of the cup is about 10 mils.

The cup formed by the above-described operation is steeped by immersing the lower or bottom portion of the cup into a medium composed of Freon (trichlorofluoromethane) maintained at a temperature of 65° F. up to within one-half inch of its top peripheral edge and maintaining the cup in this immersed condition for a period of five seconds after which the cup is withdrawn. After a fifteen second interval at a temperature of 70° F., the cup is transported to and underneath a heating device such as illustrated in FIGURE I. The cup is then raised against the device as shown in FIGURE I and air heated to a temperature of 250° F. is circulated at 9 cubic feet per minute in and out of the cup for a period of six seconds. The air flow is then terminated and the cup transported from the vicinity of the heating device.

The resulting cup has a uniform foamed outer surface throughout the area of medium immersion having an average depth of about 10 mils which constitutes approximately one-half of the overall thickness of the cup. Further examination of the cup shows that the foam has a uniform cell size within a narrow range of 7–10 mils. In brief, the overall structural properties of the cup are not seriously altered by the steeping operation while at the same time the insulating properties of the cup are increased several fold.

EXAMPLE II

An acrylonitrile-butadiene-styrene copolymer (acrylonitrile=30%; butadiene=10%) is extruded in the form of sheeting ¼″ thick and 2 feet wide. This sheet as it advances by means of support rollers is cooled substantially to room temperature and directed into a spray tank wherein methyl ethyl ketone is sprayed on the lower side of the sheet for a period of 15 seconds. The sheeting is then advanced out of the tank where it is allowed to air dry for a period of approximately 30 seconds after which the top surface of the sheeting passes directly under three banks of infrared heaters transversely positioned over the sheet. The infrared heaters serve to heat the upper side of the sheet resulting in a heat flow from the upper to the lower side of the sheet which in turn causes the bottom surface area of the plastic to foam. After the sheeting has passed the heaters, it is cut into various lengths as desired depending upon their ultimate use.

The processed sheet has a uniform foamed covering on one side similar to that obtained in Example I. Tests run on the sheeting disclose that overall sheet strength is not seriously altered by the partial foaming operation while at the same time the insulating properties of the sheeting have increased several fold.

In general, the plastics used in the practice of this invention are plastic materials which have been fabricated into various shapes and include polymers such as those based on styrene, vinyl halide, vinylidene halide, vinyl acetate, cellulose acetate or butyrate, ethyl cellulose, acrylic acid esters, methacrylic acid esters, acrylonitrile, ethylene, propylene and higher olefins, isobutylene, fluorolefines and chlorofluorolefines, as well as copoplymers, interpolymers, graft polymers, and chlorinated and chlorosulfonated polymers of the monomers corresponding to the above-mentioned polymeric products and mixtures of the same. A particularly useful material for forming articles such as containers is a rubber modified polystyrene or polystyrene which preferably has incorporated therein a rubber compound grafted on to the molecule.

The medium which is absorbable by the plastic is considered to be any material which is (1) absorbable by the plastic being processed and (2) convertible to a gaseous state at a temperature below the melting point temperature of the plastic. Preferably, the medium will contain or be a solvent for the plastic and may include a nonsolvent to slow the rate of absorption and/or partial solution of the plastic. For the sake of clarification, the term "solvent" also includes those materials in which the plastic is considered slightly soluble. The intent in the choice of the medium is to utilize materials which after exposure to the plastic will cause the plastic to partially foam on the subsequent application of heat.

The choice of the solvent which may be employed will depend primarily on the type of plastic material which is steeped. For example, acetone or methyl ethyl ketone is considered quite suitable for the acrylonitrile-butadiene-styrene copolymers while Freon (trichlorofluoromethane) is less desirable. On the other hand, Freon is considered quite suitable for polystyrene homopolymers and rubber modified interpolymers. Among the solvents which find application in the present process there may be listed Freon (trichlorofluoromethane), methylene chloride, acetone, dichloroethylene, xylene, carbon tetrachloride, methyl ethyl ketone, benzol, toluol, chloroform and the like. Among the materials which sometimes may be used as either nonsolvents or solvents depending on the type of plastic, there may be included methanol, ethanol, n-pentane, isopentane, hexane, diethylethene and the like.

The steeping operation or exposure of the plastic to the medium generally requires only a few seconds depending for the most part on the depth of foam desired, the type of medium employed, and the respective temperatures of the medium and plastic article. The steeping operation may be effected by any suitable method such as immersion of the plastic article in a liquid medium or even by subjecting the plastic article to vapors in a vessel which may or may not be pressurized.

In general, the plastic article is permitted to dry for short intervals of time prior to the heating or foaming operation. This drying interval allows deeper diffusion and serves to increase the number of cells and decrease their size. This is considered important for good insulating properties. If desired, the drying interval may be accelerated by forced air drafts, moderate heating conditions, etc.

After the drying interval, the plastic article is then heated in accordance with the practice of this invention to foam surface portions of the plastic article. As previously indicated, the heating means utilized may vary as long as the heat emanating from the heating means is not applied directly against the area to be foamed. For maximum uniformity of foaming, the thickness of the plastic through which the heat is being conducted should be fairly uniform although compensation for varying plastic thicknesses may be had by locally increasing the heat which is directed against the thicker portions of the plastics. The distance or width of the plastic body between the surface to be foamed and the surface against which heat is applied may be varied within wide limits depending on the type of plastic employed. To permit a suitable insulating foam depth into the plastic and to ensure adequate heat transfer across the body of the plastic, the distance between the surface to be foamed and the surface receiving the externally applied heat should be at least 0.0002 inch. The maximum thickness will depend on the heat conducting properties of the particular plastic and the type of medium employed. Plastics, particularly those most likely to be used in the practice of this invention, are not considered to be good heat conductors. In most instances, the thickness of the plastic will rarely exceed one-half inch. In the case of biaxially oriented plastics, it is sometimes desirable to support or fix the sheet dimensionally during the heating operation to avoid the loss of orientation during the processing operation.

The products of this invention are formed from plastic materials. The structures which may be fabricated in the practice of this invention are exceptionally useful for applications requiring good insulating characteristics and good structural properties. In addition, these structures find application in areas where sweating (atmospheric condensation) of fluid holding or supporting structures are a problem. Typical applications also include the manufacture of cups and other containers designed to hold hot or cold substances. Other applications include piping, paneling, wire covering and numerous other structures wherein this unique combination of properties is necessary or desired.

It is obvious that many variations may be made in the products and processes set forth above without departing from the spirit and scope of this invention.

What is claimed is:

1. The method for producing a uniform foamed surface on a plastic article which comprises exposing a surface portion on one side of the plastic article to a medium which is (1) absorbable by the plastic article and (2) convertible to a gaseous state at a temperature below the melting point temperature of the plastic used to form the article, and applying heat to a surface on the opposite side of the plastic article to cause surface areas which had been exposed to the medium to foam.

2. The method according to claim 1 wherein the medium is a solvent for the plastic.

3. The method according to claim 1 wherein the plastic is composed of a rubber modified polystyrene.

4. The method according to claim 2 wherein the solvent is trichlorofluoromethane.

5. The method according to claim 1 wherein heat is applied to the plastic article by convection means.

6. The method according to claim 5 wherein the convection means is adapted to direct a gas heated to an elevated temperature against the surface of the article.

7. The method for producing a uniform foamed surface on a plastic container which comprises exposing a surface portion on the external side of the plastic container to a medium which is (1) absorbable by the plastic article and (2) convertible to a gaseous state at a temperature below the melting point temperature of the plastic used to form the article, and applying heat inside the container to cause surface areas outside the container which had been exposed to the medium to foam.

8. The method according to claim 7 wherein the container is composed of a rubber modified styrene polymer.

9. The method for producing a uniform foamed surface on a plastic container which comprises exposing a surface portion on the external side of the plastic container to a medium which is absorbable by the plastic container and applying heat to the inside of the container by circulating a gas heated to an elevated temperature inside the plastic container.

References Cited

UNITED STATES PATENTS

| 2,689,980 | 9/1954 | Opavsky | 264—25 |
| 2,714,748 | 8/1955 | Stirnemann et al. | 264—50 |
| 3,039,911 | 6/1962 | Fox | 264—321 XR |
| 3,042,972 | 7/1962 | Lafferty | 264—53 |
| 3,054,146 | 9/1962 | Griffin | 264—50 |
| 3,262,625 | 7/1966 | Russell et al. | 264—45 XR |

FOREIGN PATENTS

| 545,399 | 8/1957 | Canada. |
| 850,634 | 10/1960 | Great Britain. |

ALEXANDER H. BRODMERKEL, *Primary Examiner.*

P. E. ANDERSON, *Assistant Examiner.*